(12) United States Patent
Ramamurthy et al.

(10) Patent No.: US 11,906,224 B2
(45) Date of Patent: Feb. 20, 2024

(54) CONTROLLED REFRIGERATION AND LIQUEFACTION USING COMPATIBLE MATERIALS FOR ENERGY MANAGEMENT

(71) Applicant: Energy Internet Corporation, Saratoga, CA (US)

(72) Inventors: Shankar Ramamurthy, Saratoga, CA (US); Shankar Nataraj, Allentown, PA (US)

(73) Assignee: Energy Internet Corporation, Saratoga, CA (US)

( * ) Notice: Subject to any disclaimer, the term of this patent is extended or adjusted under 35 U.S.C. 154(b) by 410 days.

(21) Appl. No.: 17/366,142

(22) Filed: Jul. 2, 2021

(65) Prior Publication Data

US 2021/0333029 A1 Oct. 28, 2021

Related U.S. Application Data

(63) Continuation-in-part of application No. 16/857,854, filed on Apr. 24, 2020, now abandoned, which is a continuation-in-part of application No. 16/747,843, filed on Jan. 21, 2020, now abandoned, which is a continuation-in-part of application No. 16/378,243, filed on Apr. 8, 2019, now Pat. No. 10,947,899, which is a continuation-in-part of application No.
(Continued)

(51) Int. Cl.
*F25B 49/02* (2006.01)
*F25J 1/02* (2006.01)
*F25B 9/00* (2006.01)

(52) U.S. Cl.
CPC .............. *F25B 49/02* (2013.01); *F25B 9/006* (2013.01); *F25J 1/0267* (2013.01)

(58) Field of Classification Search
CPC ......... F25B 49/02; F25B 9/006; F25J 1/0267; H02J 15/003
See application file for complete search history.

(56) References Cited

U.S. PATENT DOCUMENTS 5,934,076 A 8/1999 Coney
7,821,158 B2 10/2010 Vandor
(Continued)

FOREIGN PATENT DOCUMENTS

WO WO2015123784 A1 8/2015

*Primary Examiner* — Ziaul Karim
(74) *Attorney, Agent, or Firm* — Adams Intellex, PLC

(57) ABSTRACT

Disclosed techniques include enabling controlled refrigeration and liquefaction and energy management. A liquid is pumped into a closed chamber to compress a vapor. Pressure is increased in the closed chamber by pumping additional liquid into the closed chamber. The increasing pressure enables assimilation of the vapor into the liquid. The heat of compression is removed from the vapor simultaneously with compression. The liquid containing the vapor that was assimilated is withdrawn from the chamber. It is flashed to release at least a portion of the vapor that was assimilated. The flashing results in absorbing a latent heat of vaporization from surfaces in thermal contact with the liquid. A first and second heating/cooling circuit are controlled. Gas within the first heating/cooling circuit is cooled and compressed using a liquid piston. A gas is warmed within the second heating/cooling circuit, and expansion is accomplished using a liquid piston.

7 Claims, 6 Drawing Sheets

Related U.S. Application Data

16/118,886, filed on Aug. 31, 2018, now Pat. No. 10,725,441.

(60) Provisional application No. 63/178,560, filed on Apr. 23, 2021, provisional application No. 63/152,357, filed on Feb. 23, 2021, provisional application No. 63/110,417, filed on Nov. 6, 2020, provisional application No. 63/048,032, filed on Jul. 3, 2020, provisional application No. 62/981,629, filed on Feb. 26, 2020, provisional application No. 62/916,449, filed on Oct. 17, 2019, provisional application No. 62/838,992, filed on Apr. 26, 2019, provisional application No. 62/795,133, filed on Jan. 22, 2019, provisional application No. 62/795,140, filed on Jan. 22, 2019, provisional application No. 62/784,582, filed on Dec. 24, 2018, provisional application No. 62/679,051, filed on Jun. 1, 2018, provisional application No. 62/654,718, filed on Apr. 9, 2018, provisional application No. 62/654,859, filed on Apr. 9, 2018, provisional application No. 62/552,747, filed on Aug. 31, 2017.

(56) References Cited

U.S. PATENT DOCUMENTS

| | | |
|---|---|---|
| 7,870,746 B2 | 1/2011 | Vandor |
| 8,020,404 B2 | 9/2011 | Vandor |
| 8,063,511 B2 | 11/2011 | Vandor |
| 9,260,018 B2 | 2/2016 | Vandor |
| 9,540,957 B2 | 1/2017 | Shinnar et al. |
| 9,562,183 B2 | 2/2017 | Hidalgo et al. |
| 9,568,235 B2 | 2/2017 | Dobbs |
| 9,631,846 B2 | 4/2017 | Chen et al. |
| 9,651,030 B2 | 5/2017 | Kim et al. |
| 9,664,140 B2 | 5/2017 | Kalika |
| 10,563,621 B2 | 2/2020 | Pages |
| 2003/0036806 A1 | 2/2003 | Schienbein et al. |
| 2008/0046387 A1* | 2/2008 | Gopal ............... H02J 3/008 705/412 |
| 2008/0071705 A1* | 3/2008 | Enis ............... G06Q 50/06 705/412 |
| 2008/0172279 A1 | 7/2008 | Enis et al. |
| 2009/0200805 A1* | 8/2009 | Kim ............... F04F 1/06 60/412 |
| 2009/0226308 A1 | 9/2009 | Vandor |
| 2009/0282840 A1 | 11/2009 | Chen et al. |
| 2009/0301089 A1* | 12/2009 | Bollinger ............... F01K 27/00 60/648 |
| 2009/0319090 A1 | 12/2009 | Dillon et al. |
| 2010/0308765 A1* | 12/2010 | Moore ............... H02J 7/0025 320/148 |
| 2010/0312490 A1* | 12/2010 | Dooley ............... F22B 37/38 702/24 |
| 2011/0061385 A1* | 3/2011 | Baxter ............... F23J 15/06 60/671 |
| 2011/0083438 A1* | 4/2011 | McBride ............... F03G 6/071 60/682 |
| 2012/0053737 A1 | 3/2012 | Valluri et al. |
| 2012/0144815 A1* | 6/2012 | Stromotich ............... F03B 13/1855 60/327 |
| 2013/0168961 A1 | 7/2013 | Stahlkopf et al. |
| 2013/0336721 A1* | 12/2013 | McBride ............... F17C 1/007 405/55 |
| 2014/0039710 A1 | 2/2014 | Carter et al. |
| 2014/0129042 A1 | 5/2014 | Miner |
| 2014/0172182 A1 | 6/2014 | Subbotin et al. |
| 2014/0246792 A1* | 9/2014 | Pavlov ............... F03D 9/255 60/486 |
| 2015/0033724 A1* | 2/2015 | Fong ............... F01B 17/022 60/407 |
| 2015/0143806 A1 | 5/2015 | Friesth |
| 2015/0192358 A1 | 7/2015 | Morgan et al. |
| 2015/0308079 A1* | 10/2015 | Vigholm ............... G05B 15/02 700/282 |
| 2016/0047597 A1 | 2/2016 | Brett et al. |
| 2016/0207703 A1 | 7/2016 | Elazari-Volcani |
| 2016/0336928 A1 | 11/2016 | Kuznetsov |
| 2017/0005515 A1 | 1/2017 | Sanders |
| 2017/0038157 A1 | 2/2017 | O'Donnell et al. |
| 2017/0044414 A1 | 2/2017 | Sutterlin et al. |
| 2017/0067667 A1 | 3/2017 | Choi |
| 2017/0082060 A1 | 3/2017 | Kalika |
| 2017/0082123 A1 | 3/2017 | Momen et al. |
| 2017/0082380 A1 | 3/2017 | Gauche et al. |
| 2017/0159495 A1 | 6/2017 | Laughlin et al. |
| 2019/0003425 A1 | 1/2019 | Pages |
| 2019/0056174 A1 | 2/2019 | Ragot et al. |
| 2020/0400372 A1 | 12/2020 | Castellucci et al. |

\* cited by examiner

CONTROLLED REFRIGERATION AND LIQUEFACTION USING COMPATIBLE MATERIALS FOR ENERGY MANAGEMENT

RELATED APPLICATIONS

This application claims the benefit of U.S. provisional patent applications "Controlled Liquefaction Using Compatible Materials for Energy Management" Ser. No. 63/048,032, filed Jul. 3, 2020, "Control of Software Defined Mechanical Machines Using Description Language" Ser. No. 63/110,417, filed Nov. 6, 2020, "Energy Storage and Buffering Using Multiple Pressure Containers" Ser. No. 63/152,357, filed Feb. 23, 2021, and "Gas Liquefaction Using Hybrid Processing" Ser. No. 63/178,560, filed Apr. 23, 2021.

This application is also a continuation-in-part of U.S. patent application "Energy Transfer Through Fluid Flows" Ser. No. 16/857,854, filed Apr. 24, 2020, which claims the benefit of U.S. provisional patent applications "Energy Transfer Through Fluid Flows" Ser. No. 62/838,992, filed Apr. 26, 2019, "Desalination Using Pressure Vessels" Ser. No. 62/916,449, filed Oct. 17, 2019, and "Controlled Liquefaction and Energy Management" Ser. No. 62/981,629, filed Feb. 26, 2020.

The U.S. patent application "Energy Transfer Through Fluid Flows" Ser. No. 16/857,854, filed Apr. 24, 2020 is also a continuation-in-part of U.S. patent application "Energy Management Using a Converged Infrastructure" Ser. No. 16/747,843, filed Jan. 21, 2020, which claims the benefit of U.S. provisional patent applications "Energy Management Using a Converged Infrastructure" Ser. No. 62/795,140, filed Jan. 22, 2019, "Energy Management Using Electronic Flywheel" Ser. No. 62/795,133, filed Jan. 22, 2019, "Energy Transfer Through Fluid Flows" Ser. No. 62/838,992, filed Apr. 26, 2019, and "Desalination Using Pressure Vessels" Ser. No. 62/916,449, filed Oct. 17, 2019.

The U.S. patent application "Energy Management Using a Converged Infrastructure" Ser. No. 16/747,843, filed Jan. 21, 2020 is also a continuation-in-part of U.S. patent application "Energy Storage and Management Using Pumping" Ser. No. 16/378,243, filed Apr. 8, 2019, which claims the benefit of U.S. provisional patent applications "Modularized Energy Management Using Pooling" Ser. No. 62/654,718, filed Apr. 9, 2018, "Energy Storage and Management Using Pumping" Ser. No. 62/654,859, filed Apr. 9, 2018, "Power Management Across Point of Source to Point of Load" Ser. No. 62/679,051, filed Jun. 1, 2018, "Energy Management Using Pressure Amplification" Ser. No. 62/784,582, filed Dec. 24, 2018, "Energy Management Using a Converged Infrastructure" Ser. No. 62/795,140, filed Jan. 22, 2019, and "Energy Management Using Electronic Flywheel" Ser. No. 62/795,133, filed Jan. 22, 2019.

The U.S. patent application "Energy Storage and Management Using Pumping" Ser. No. 16/378,243, filed Apr. 8, 2019, is also a continuation-in-part of U.S. patent application "Energy Management with Multiple Pressurized Storage Elements" Ser. No. 16/118,886, filed Aug. 31, 2018, which claims the benefit of U.S. provisional patent applications "Energy Management with Multiple Pressurized Storage Elements" Ser. No. 62/552,747, filed Aug. 31, 2017, "Modularized Energy Management Using Pooling" Ser. No. 62/654,718, filed Apr. 9, 2018, "Energy Storage and Management Using Pumping" Ser. No. 62/654,859, filed Apr. 9, 2018, and "Power Management Across Point of Source to Point of Load" Ser. No. 62/679,051, filed Jun. 1, 2018.

Each of the foregoing applications is hereby incorporated by reference in its entirety

FIELD OF ART

This application relates generally to refrigeration and liquefaction control and more particularly to controlled refrigeration and liquefaction using compatible materials for energy management.

BACKGROUND

The increase in the demand for energy has in no small part been propelled by the growth of municipalities, counties, states, and countries. Electrical and transportation needs have experienced some of the most dramatic energy usage increases. In addition, improvements in the living standards in rural and undeveloped areas, including the extension of electrical and communications infrastructure to these areas, or the expansion of transportation networks, has driven a tremendous need for energy. Increased energy demand is further propelled by improved living standards. Growing populations cause a further increase in energy demand as more people consume energy for cooking, bathing, cleaning, laundry, and entertaining. Energy is additionally consumed for illuminating, heating, and cooling houses or apartments, businesses, and government buildings. Expanded economic activities, including retail, public transportation, and manufacturing, among many others, further increase energy demand. Some countries are actively engaged in reducing their energy demands or "carbon footprint". These countries are revamping their energy infrastructures by making energy efficiency improvements and investments in renewable energy sources. Other countries are instead constructing fossil fuel burning power plants, nuclear facilities, hydro dams, and other traditional and controversial energy generation sources.

There are many stakeholders, including energy producers and energy consumers, in the energy landscape. Energy producers include traditional and renewable energy sources, while energy consumers include government agencies, business and industry, and domestic consumers. Many energy consumers endeavor to reduce their energy consumption and cost. These consumers are motivated to initiate, practice, and enforce energy conservation measures for environmental and economic reasons. Consumers can decrease their energy footprints and associated costs by moderating their heating and cooling habits; scheduling processing and manufacturing tasks at low energy cost times; turning off unnecessary lights; and purchasing energy-efficient appliances and machines, electronic consumer products, and automobiles. These and other concerted conservation efforts are generally helpful, but the demand for energy of all types continues to increase beyond what energy conservation alone can achieve. The growth of human populations increases the demand for all kinds of energy, resulting in what many analysts identify as an energy crisis. Thus, addressing increasing energy demand is complex. Increased demand for and overconsumption of energy has imposed strains on natural and renewable resources alike, resulting in fuel shortages and increased environmental destruction and pollution. In addition, environmental events such as forest fires, severe cold, and excessive heat can further affect both the supply of and the demand for energy. Energy distribution deficiencies and inefficiencies present nettlesome obstacles to solving the energy crisis. The existing energy distribution infrastructure is at or over capacity, thus rendering the infrastructure inaccessible to potential expansion or renewable sources. Further, there is often adamant and vociferous opposition to siting of mountain or offshore wind turbines, solar farms, or wood burning plants. Even if designs can be drafted and permits obtained to construct renewable energy sources, the distribution of the energy is impeded by the poor infrastructure. Commissioning new energy generation facilities remains a seemingly insurmountable challenge, but new energy sources must be developed.

SUMMARY

The production of energy includes diverse and disparate generation sources. Energy production traditionally has been based on burning fossil fuels, harnessing water power, converting radiated energy to steam, and so on. Other energy production techniques are based on renewable sources such as solar, wind, and biomass sources. Whatever energy production techniques are utilized, there can be significant differences between the amount of generated energy available and the energy consumption demand. The difference between energy production and energy consumption typically increases and/or decreases over a given period of time. Further, these differences can depend on a timeframe, such as day versus night, day of the week, office hours, manufacturing schedules, seasonal factors such as heating or cooling, and so on. The discrepancies between energy production and consumption can be significant and at times acute.

Discrepancies between energy production and energy consumption can in part be correlated to the many time-dependent factors. The time-dependent factors include industrial, governmental, and consumer energy demand fluctuations; changeable energy production capabilities such as the presence or absence of a renewable resource used to generate the energy; available capacity of commercial or grid power; the amount of standby or backup energy; and so on. Energy discrepancies can cause voltage drops, outages, rolling blackouts, electrical energy distribution network failures, and so on. To ameliorate the energy production versus consumption asymmetry, energy that exceeds demand at a given time can be stored for later use. The stored energy can be sourced when demand exceeds a given power level by supplementing the generated energy. Energy can be collected and stored when a renewable resource is available, when the amount of energy available exceeds the amount of energy needed, or even when the cost of production of the energy is relatively inexpensive. The stored energy can be used to augment available energy or instead to provide the amount of energy that is needed during periods of increased or unmet energy need. The recovery or extraction of stored energy can be applied to low-level energy demand scenarios, such as the energy needs of a house or small farm operation, or to larger scale energy needs such as the energy needs for manufacturing, or even to the largest energy needs such as an energy distribution grid.

Disclosed techniques address refrigeration and liquefaction control using compatible materials for energy management. A liquid is pumped into a closed chamber to compress a vapor. Heat is removed within the chamber. The removing heat results in substantially maintaining isothermality. Pressure in the closed chamber is increased by pumping additional liquid into the closed chamber, wherein the increasing pressure enables assimilation of the vapor into the liquid. The liquid is withdrawn from the chamber, wherein the liquid contains the vapor that was assimilated. The liquid is flashed to release at least a portion of the vapor that was assimilated, wherein the flashing results in absorbing a latent heat of vaporization from adjacent surfaces in thermal contact with the liquid. The flashing comprises reducing pressure for the liquid. The flashing of the liquid accomplishes vaporizing of the liquid. The flashing results in boiling of the liquid. The absorbing a latent heat of vaporization from adjacent surfaces results in furnishing a refrigeration duty that reduces a temperature of the adjacent surfaces or adjoining media below an ambient temperature.

In further disclosed techniques, a method for refrigeration control is disclosed comprising: pumping a liquid into a closed chamber to compress a vapor; increasing pressure in the closed chamber by pumping additional liquid into the closed chamber, wherein the increasing pressure enables assimilation of the vapor into the liquid; removing the heat of compression from the vapor simultaneously with compression; withdrawing the liquid from the chamber, wherein the liquid contains the vapor that was assimilated; and flashing the liquid to release at least a portion of the vapor that was assimilated, wherein the flashing results in absorbing a latent heat of vaporization from adjacent surfaces in thermal contact with the liquid.

Disclosed techniques address refrigeration and liquefaction control and energy management. A first heating/cooling circuit and a second heating/cooling circuit are controlled. A gas is cooled within the first heating/cooling circuit with a liquid using a compression/flash-expansion mode and wherein compression is accomplished using a liquid piston. A gas is warmed within the second heating/cooling circuit, coupled to the first heating/cooling circuit, wherein expansion is accomplished using a liquid piston. The compression and the expansion can be accomplished substantially isothermally. The compression and the expansion can be accomplished substantially isothermally by use of a liquid spray or a packing.

Disclosed techniques further address refrigeration and liquefaction control and energy management by disclosing a method of refrigeration comprising: pumping a compatible liquid into a closed chamber to compress a vapor, wherein the compatibility is between the liquid that is pumped and the refrigerant vapor and refrigeration process; increasing pressure in the closed chamber by pumping additional compatible liquid into the closed chamber, wherein the increasing pressure is controlled to prevent condensation of the vapor inside the closed chamber into the liquid; removing the heat of compression from the vapor simultaneously with compression; withdrawing the compressed vapor from the chamber; condensing at least a portion of the compressed vapor into a liquid condensate, wherein the condensing includes cooling the compressed vapor; and flashing the liquid condensate to release at least a portion of the vapor that was condensed, wherein the flashing results in absorbing a latent heat of vaporization from adjacent surfaces in thermal contact with the liquid.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1A:
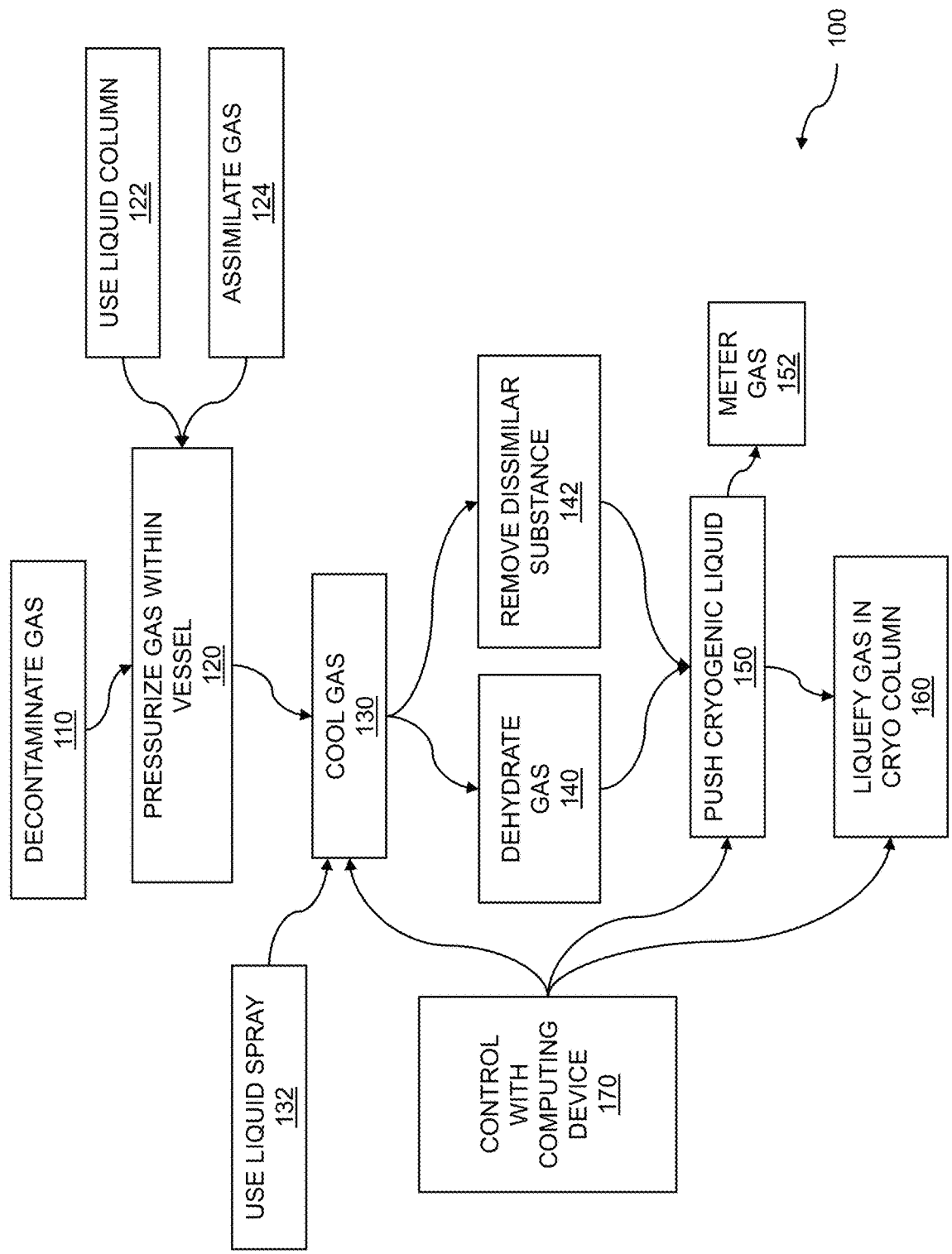
FIG. 1A is a flow diagram for controlled liquefaction and energy management.

This disclosure provides techniques for controlled liquefaction and energy management. The energy management is based on controlled liquefaction using compatible materials. The controlled liquefaction can be used for energy storage and extraction. The controlling of the liquefaction is based on using heating/cooling circuits, where a heating/cooling circuit comprises a pressure vessel and a heat exchanger. One or more heating/cooling circuits can comprise a liquid piston refrigerator. At various locations within the liquid piston refrigerator, there can be multiple phases of a substance, such as liquid and gas phases. By using compatible materials for the liquid and the gas within the heating/cooling circuit, the liquid does not freeze at the refrigeration temperature and the gas and the liquid do not introduce impurities to one another. As a result, removal of a substance is not required after compression.

The heating/cooling circuits and the liquid piston refrigerator can be part of a large-scale energy storage subsystem which can store energy from one or more points of generation. The stored energy can be provided after a period of time to meet energy demands of dynamic loads. The energy that is stored can be received from diverse and disparate energy sources. Energy can be stored when the amount of energy available from the points of generation exceeds the energy demand at the time of energy generation. The energy can be stored for a period of time. The energy storage includes electrical energy storage using batteries or capacitors. The energy storage can include multiple pressurized storage elements such as compressed air storage elements. The energy storage includes the one or more liquid piston refrigerators based on heating/cooling circuits. In some embodiments, the storage of the energy and the recovery of the energy can include use of a water piston heat engine. Managing the sourcing, storing, and transforming of energy is a complex and highly challenging task. Energy management can be influenced by many factors including the weather, wildly varying energy demand, variable pricing schemes, natural disasters, and so on. Energy management can be further complicated by quickly changing customer energy demands, requirements of service level agreements (SLAs), etc. Despite the growing use of renewable energy resources such as solar, wind, wave action, tidal, geothermal, biogas, biomass, and the like, two significant challenges remain: the amount of energy produced by a given renewable energy source is highly variable, and the availability of the renewable energy source is intermittent. As an example, wind energy is only available when wind is present, solar energy only when the sun is shining, wave action energy only when there is wave action, and so on.

Energy with intermittent availability or excess energy can be stored or cached when the energy is being produced and can be extracted at a later time when the stored energy is needed. A similar strategy can be used based on price, where energy is stored when production cost is low, then later extracted when the energy production cost is high. The stored energy can be used in combination with other energy sources, such as grid power or microgrid (local) power, to meet energy demands at given times. Storage can include a period of time, where the period of time can be a short-term basis or a long-term basis. Energy losses are introduced when converting energy from one energy type to another energy type. Further losses occur when storing energy, extracting energy, routing energy, etc. Minimizing the energy losses is critical to any energy storage and retrieval/recovery technique. Electrical energy storage is possible using techniques such as mature storage battery technologies, but the costs of large battery banks are prohibitive in terms of up-front cost and maintenance costs. Further, batteries are problematic for long-term storage purposes because of charge leakage. While supercapacitors can also be used for electrical energy storage, their cost is prohibitive.

In disclosed techniques, energy management uses controlled liquefaction. Energy can be stored for later use. The energy can be obtained locally using a microgrid, or from farther afield using a grid. The energy can be generated using fuels such as coal, natural gas, or nuclear sources; using hydro power or geothermal energy; using renewable sources such as solar, wind, tidal, wave action, biofuels or biogas; using pump-turbine sources such as compressed air, steam, or ice; using backup power sources such as diesel-generator sets; and so on. A gas within a pressure containment vessel is pressurized using a column of liquid. The liquid used for the pressurizing can include a liquid such as water.

Energy storage can be based on an energy storage and conversion requirement. Energy can be stored and converted using a liquefied gas-based energy management system, where the energy management system can include a pump or pump-turbine subsystem connected to one or more gas liquefaction systems. The liquefied gas-based energy management system can be part of a larger energy management system that includes large-scale energy storage subsystem. The large-scale energy storage subsystem can store electrical energy, potential energy, thermal energy, kinetic energy, etc. A gas within a pressure containment vessel is compressed using a column of liquid. The column of liquid can be a component of a liquid piston system comprising the column of liquid and a pump or pump turbine. The pump can be driven by electrical energy. The gas which is being pressurized is cooled using a liquid spray. The liquid spray can be used to keep the pressurizing to be isothermal. Isothermal pressurizing maintains a constant or near-constant temperature of the gas being pressurized. The liquid spray is a dissimilar substance from the gas which is being pressurized. The dissimilar substances of the gas and the cooling spray can later be separated or isolated. A cryogenic liquid column is pushed, using the gas which is being pressurized, into a second vessel. The cryogenic liquid column can include a liquid phase of the gas which is being pressurized. The gas which is being pressurized is pushed into the cryogenic liquid column. The cryogenic column can be located within a cryogenic tank or similar structure.

A liquid is pumped into a closed chamber to compress a vapor. Heat is removed within the chamber. The removing heat results in substantially maintaining isothermality. Pressure in the closed chamber is increased by pumping additional liquid into the closed chamber, wherein the increasing pressure enables assimilation of the vapor into the liquid. The liquid is withdrawn from the chamber, wherein the liquid contains the vapor that was assimilated. The liquid is flashed to release at least a portion of the vapor that was assimilated, wherein the flashing results in absorbing a latent heat of vaporization from adjacent surfaces in thermal contact with the liquid. The flashing comprises reducing pressure for the liquid. The flashing of the liquid accomplishes vaporizing of the liquid. The flashing results in boiling of the liquid. The absorbing a latent heat of vaporization from adjacent surfaces results in furnishing a refrigeration duty that reduces a temperature of the adjacent surfaces or adjoining media below an ambient temperature. In further disclosed techniques, a first heating/cooling circuit and a second heating/cooling circuit are controlled. A gas within the first heating/cooling circuit is cooled with a liquid using a compression/flash-expansion mode, wherein compression is accomplished using a liquid piston. A gas is warmed within the second heating/cooling circuit, coupled to the first heating/cooling circuit, wherein expansion is accomplished using a liquid piston.

FIG. 1A is a flow diagram for controlled liquefaction and energy management. Energy storage and management can be based on controlled liquefaction. The controlled liquefaction energy management subsystem can store various forms of energy, such as electrical energy, by storing the energy as one or more cryogenic liquid columns in cryogenic tanks. The energy can be stored based on a liquid phase of a gas which is being pressurized. The energy can be stored using gaseous energy transfer, where the gas can include a vacuum, air, or a gas such as $NH_3$, $CH_4$, Liquefied Natural Gas, air, or Freon™. The controlled liquefaction energy management subsystem can be part of a large energy storage subsystem, where the energy storage subsystems can include multiple batteries or capacitors, pressurized storage elements such as high-pressure water, pressurized air, steam, ice-water slurry, and the like. A gas is pressurized within a pressure containment vessel using a column of liquid. The gas which is being pressurized is cooled using a liquid spray. A cryogenic liquid column is pushed, using the gas which is being pressurized, into a second vessel. The gas which is being pressurized is liquefied into the cryogenic liquid column.

A flow 100 is shown for controlled liquefaction and energy management. Controlled liquefaction can be accomplished by liquefying a gas which is being pressurized into a cryogenic liquid column. Energy, such as electrical energy from a traditional electrical grid, energy from renewable sources, and so on, can be stored. Thermal energy, mechanical energy, pressure, and other forms of energy can also be stored. The energy can be transformed into an energy format which can be stored for a length of time. Energy management can be used for storing, retrieving, or extracting energy from an energy storage subsystem. The energy storage subsystem can be a large-scale energy storage subsystem or can be a small-scale energy storage subsystem. The energy storage subsystem can be based on battery storage, capacitor storage, inductive storage, compressed air storage, steam or ice storage, ice-water slurry, and so on. Described herein, the energy storage subsystem can include a controlled liquefaction subsystem. A controlled liquefaction storage subsystem can include energy storage elements such as high-pressure chambers, compression-expansion chambers, compressed air chambers, and so on. The energy storage subsystems can include cryogenic liquid columns. A controlled liquefaction energy management system can be implemented within a cryogenic tank. The storage elements of an energy storage subsystem can store various energy types including electrical energy, thermal energy, kinetic energy, mechanical energy, hydraulic energy, and so on.

The flow 100 includes decontaminating a gas 110 which is being pressurized prior to the pressurizing. Discussed throughout, the gas which can be pressurized can include gases such as $NH_3$ (ammonia), CH4 (methane), liquefied natural gas (LNG), air, or Freon™. The gases can contain contaminants which can be removed prior to pressurizing the gases. Depending on the gas, the contaminants can include dust, pollen, hair, insects, and so on. The gases can be decontaminated prior to pressurizing to improve efficiency of the pressurizing; to prevent blockages within pressure tanks, valves, or pipes; for safety; and so on. The decontaminating can be based on mechanical filters, electrostatic filters, deionization, etc. The flow 100 includes pressurizing a gas within a pressure containment vessel 120. The pressurizing the gas within a pressure containment vessel can be accomplished using a pump, a pump-turbine, pressure amplification pipes, and so on. In the flow 100, the pressurizing uses a column of liquid 122. The column of liquid can be located within a liquid piston system comprising a high-pressure vessel and a pump. The liquid can occupy one portion of the high-pressure vessel and the gas can occupy another portion of the high-pressure vessel. The pump can impel liquid into the vessel, thus pressurizing the gas. In embodiments, the pressurizing a gas can be accomplished using a plurality of stages. The plurality of stages can include a plurality of high-pressure vessels and pumps. In embodiments, the gas which is being pressurized can be stored in a gas capacitor following the gas being pressurized. The gas capacitor can store or provide pressurized gas, can reduce variations in gas pressure, and so on. In further embodiments, the gas which is being pressurized can include $NH_3$, $CH_4$, Liquefied Natural Gas, air, or Freon™. Other elemental or manufactured gases can also be used. The pressurizing a gas can enable assimilation of the gas into the liquid piston liquid 124. Pressure in the closed chamber is increased by pumping additional liquid into the closed chamber, wherein the increasing pressure enables assimilation of the vapor into the liquid, such that the vapor mix is completely absorbed or condensed into the liquid phase, thus enabling critical state mixing in the liquid. The assimilation can be described as being substantially assimilated into the liquid. The substantial assimilation can comprise at least a 10% mass reduction of the vapor.

The flow 100 includes cooling the gas 130 which is being pressurized. Compressing a gas can generate significant amounts of heat. The heat that can be released can include the heat of vaporization of the gas. This generated heat can damage the liquid piston system or other components used for controlled liquefaction and energy management. The generated heat could ignite certain gases that are being pressurized. In the flow 100, the cooling uses a liquid spray 132. The liquid spray can be used to remove excess generated heat from the pressure containment vessel. In embodiments, the liquid spray can keep the pressurizing to be isothermal. Isothermal pressurizing can maintain a constant or near-constant temperature within the pressure containment vessel. In other embodiments, the liquid spray can be a dissimilar substance from the gas which is being pressurized.

The flow 100 includes dehydrating the gas 140 which is being pressurized after the cooling. The cooling of the gas which is being pressurized can cause water vapor to precipitate out of the gas. The dehydrating the gas can accomplish the removal of the water vapor or other vapors from the pressurized gas post cooling. The flow 100 includes removing the dissimilar substance 142 after the cooling. The dissimilar substance used for cooling the pressurized gas can be removed from the pressurized gas. The dissimilar substance can be removed for later reuse for cooling or other energy management applications, discarded, and so on. The removing the dissimilar substance can return the pressurized gas to or nearly to the previous purity level of the pressurized gas.

The flow 100 includes pushing a cryogenic liquid column 150, using the gas which is being pressurized, into a second vessel. The second vessel can include a pressure containment vessel, a gas capacitor, and so on. The second vessel can be located in a variety of positions relative to the first pressure containment vessel. In embodiments, the second vessel can be elevated. The second vessel can include the cryogenic tank. The second vessel can be elevated to a height such that the second vessel can enable gravitational filling of the gas capacitor. The pushing can be accomplished using a pump, a pump-turbine, and so on. In embodiments, the cryogenic liquid column is located within a cryogenic tank. The cryogenic tanks include a plurality of cryogenic liquid columns. In embodiments, the cryogenic liquid column can include a liquid phase of the gas which is being pressurized. In the flow 100, the pushing the cryogenic liquid column is accomplished by metering the gas 152 which is being pressurized. The metering the gas can include metering an amount of gas, a rate of gas flow, and so on. In embodiments, the metering is controlled to limit rise of the cryogenic liquid column to a height h. The rise of the cryogenic liquid column can occur within the cryogenic tank.

The flow 100 includes liquefying the gas which is being pressurized into the cryogenic liquid column 160. Gas liquefaction can enable storage of energy such as renewable energy by converting the renewable energy to the liquefied gas. The liquefied gas can be used at a later time to spin a turbine, for example, to convert the energy stored as the liquefied gas to a different energy form such as electrical energy. The flow 100 includes controlling 170 the pressurizing, the cooling, the pushing, and the liquefying using a computing device. The computing device can include a desktop or laptop computer, a controller or microcontroller, and so on. The computing device can include cloud-based computing, distributed computing, mesh computing, and the like. The controlling can be accomplished using an application on the computing device, or through an app on a personal electronic device such as a tablet, a smartphone, or a PDA. Other embodiments include controlling the pressurizing, the cooling, the pushing, and the liquefying based on work performed using the cryogenic liquid column. This latter controlling can be accomplished by recovering energy stored in the cryogenic liquid column. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 1B:
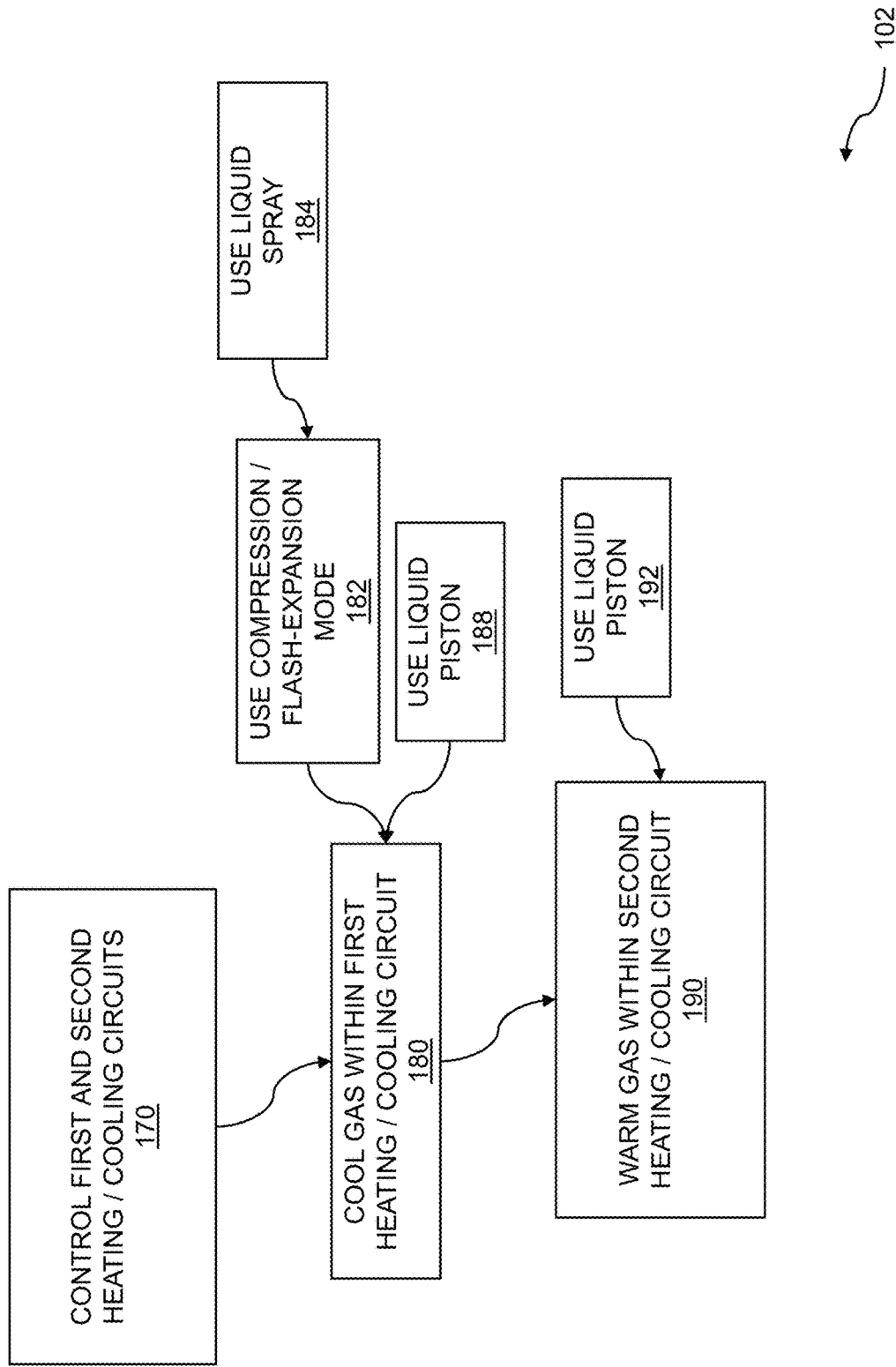
FIG. 1B is a flow diagram for controlled liquefaction using compatible materials for energy management.

FIG. 1B is a flow diagram for controlled liquefaction using compatible materials for energy management. In further disclosed techniques, energy management uses controlled liquefaction. Discussed throughout, energy such as renewable energy, energy that is obtained at low cost, etc., can be stored for later use. The energy can be obtained locally from sources comprising a microgrid, or from farther afield using other sources such as a utility grid. The energy that is obtained can be generated using a variety of fuels such as coal, natural gas, or nuclear energy; using hydro power or geothermal energy; using renewable sources such as solar, wind, tidal, wave action, biofuels or biogas; using pump-turbine sources such as compressed gas, steam, or liquid; using backup power sources such as diesel-generator sets; and so on. A gas within a high-pressure containment vessel is pressurized using a liquid piston. The liquid used for the pressurizing can include a liquefied gas such as liquefied natural gas (LNG), liquefied methane (C1), and so on.

Energy storage can be based on a variety of requirements associated with energy storage and conversion or extraction. Energy can be stored and converted using a liquefied gas-based energy management system, where the energy management system can include a pump or pump-turbine subsystem connected to one or more gas liquefaction systems. The liquefied compatible materials-based energy management system can be part of heating/cooling circuits, where each heating/cooling circuit comprises a pressure vessel and a heat exchanger. Controlled liquefaction can be part of a larger energy management system that includes a large-scale energy storage subsystem. The large-scale energy storage subsystem can store electrical energy, potential energy, thermal energy, kinetic energy, etc. A first heating/cooling circuit and a second heating/cooling circuit are controlled. The heating/cooling circuits can include pressure vessels and heat exchangers. A pump can be used move a column of liquid to compress a gas within a high-pressure vessel. A heat exchanger can be used to remove excess heat created by compressing the gas, or to provide heat to warm a gas cooled by expansion. In embodiments, the heat removed to chill the compressed gas is used to warm the expanded gas. A gas is cooled within the first heating/cooling circuit with a liquid using a compression/flash-expansion mode, wherein compression is accomplished using a liquid piston. In some embodiments, the gas is cooled using a liquid spray. In other embodiments the gas is cooled by structured packing. The liquid spray can be used to keep the pressurizing to be isothermal. Isothermal pressurizing maintains a constant or near-constant temperature of the gas being pressurized. The liquid spray is a compatible substance to the gas which is being pressurized. A gas is warmed within the second heating/cooling circuit, coupled to the first heating/cooling circuit, wherein expansion is accomplished using a liquid piston. The liquid comprising the liquid piston can be expelled from the second heating/cooling circuit and returned to a reservoir or tank. The pressure of the liquid within the reservoir can include 1 atmosphere.

A flow 102 for energy management based on controlled liquefaction using compatible materials is shown. Controlled liquefaction can be accomplished by liquefying a gas which is being pressurized. The gas can be pressurized within a pressure vessel using a liquid column, where the liquid column comprises a liquid piston. Excess heat from pressurizing can be removed using a heat exchanger. Energy, such as electrical energy from a traditional electrical grid, energy from renewable sources, and so on, can be stored. Thermal energy, mechanical energy, pressure, and other forms of energy can also be stored. The energy can be transformed into an energy format which can be stored for a length of time. Energy management can be used for storing, retrieving, or extracting energy from an energy storage subsystem. The energy storage subsystem can be a large-scale energy storage subsystem or can be a small-scale energy storage subsystem. The energy storage subsystems can be based on battery storage, capacitor storage, inductive storage, compressed air storage, steam or ice storage, icewater slurry, and so on. Described herein, the energy storage subsystem can include a controlled liquefaction subsystem. A controlled liquefaction storage subsystem can include energy storage elements such as high-pressure chambers or vessels, compression-expansion chambers, compressed air chambers, and so on. The energy storage subsystems can include liquid pistons. A controlled liquefaction energy management system can be implemented within a liquid piston refrigerator. The storage elements of an energy storage subsystem can store various types of energy including electrical energy, thermal energy, kinetic energy, mechanical energy, hydraulic energy, and so on.

Controlled liquefaction that uses compatible materials is based on accomplishing compression of a vapor mix by a liquid piston. Compression of the vapor mix by the liquid piston enables the vapor mix to be completely absorbed or condensed into the liquid phase of the vapor mix. The liquid piston, which can be a material compatible with the gas, can be used to replace a traditional mechanical piston for phase pressurization. Phase pressurization based on compression by the liquid piston can be applied to a wide variety of applications including liquefaction of a variety of gases. In embodiments, liquid piston compression can be applied to liquefaction of gases including methane/natural gas (CH4/NG), liquefaction or air or nitrogen (N2), and so on. The use of the liquid piston for compression can be used for a range of refrigeration applications including liquefaction.

The flow 102 includes controlling 170 a first heating/cooling circuit and a second heating/cooling circuit. Control of a heating/cooling circuit can be based on using a pump or an auxiliary pump; one or more of valves, smart valves, or Joule Thomson valves; computers or processors; and so on. In embodiments, a heating/cooling circuit comprises a pressure vessel and a heat exchanger. The pressure vessel can include a cylindrical vessel, a spherical vessel, and so on. A pressure vessel such as a cylindrical vessel can be configured in a vertical orientation, a horizontal orientation, etc. The heat exchanger can include a tubular heat exchanger, a plate and fin heat exchanger, and the like. In embodiments, the heat exchanger comprises a coil-wound heat changer (CWHE). The first heating/cooling circuit and the second heating/cooling circuit can be used for liquefaction of a gas. Liquefaction of the gas converts the gas to a liquid. In embodiments, liquefaction can be accomplished for the gas within the first heating/cooling circuit. Liquefaction can be applied to a variety of gases. In embodiments, liquefaction can be accomplished for natural gas (NG). Liquefaction of natural gas produces liquefied natural gas (LNG) which is easier to store and transport than natural gas in gaseous phase. In other embodiments, liquefaction can be accomplished for methane (C1). Methane can be the primary constituent of NG. In further embodiments, the liquefaction can be accomplished for other heavier hydrocarbon gases in gaseous or liquid form, which can be used as a refrigerant.

The flow 102 includes cooling a gas 180 within the first heating/cooling circuit with a liquid. Since compressing a gas causes the temperature of the gas to increase, compression of the gas can remain substantially isothermal by cooling the gas (discussed below). The flow 102 includes using a compression/flash-expansion mode 182. The compression can be accomplished by pumping gas or liquid into the high-pressure vessel. In embodiments, compression can be accomplished substantially isothermally. Since increasing pressure of a gas causes the temperature of the gas to rise, the heat generated by the compressing can be removed to maintain isothermal conditions. In the flow 102, the compression is accomplished substantially isothermally by use of liquid spray 184. The liquid spray can be introduced into the high-pressure vessel using inlets, ports, channels, injectors, and so on. In embodiments, the spraying is generated using nozzles.

In the flow 102, compression is accomplished using a liquid piston 188. The liquid piston pushes onto the gas within a vessel to compress the gas. The gas that is compressed and the liquid that is used for a liquid piston to accomplish compression can include compatible materials.

The flow 102 includes warming a gas within the second heating/cooling circuit 190, coupled to the first heating/cooling circuit. In the flow 102, expansion is accomplished using a liquid piston 192. The expanding gas presses against the liquid piston, which can cause liquid comprising the liquid piston to be pushed out of the second high-pressure vessel of the second heating/cooling circuit. The expelled liquid can be returned to a tank or reservoir for further use including controlled liquefaction.

Various steps in the flow 102 may be changed in order, repeated, omitted, or the like without departing from the disclosed concepts. Various embodiments of the flow 102 can be included in a computer program product embodied in a non-transitory computer readable medium that includes code executable by one or more processors.

Figure 2:
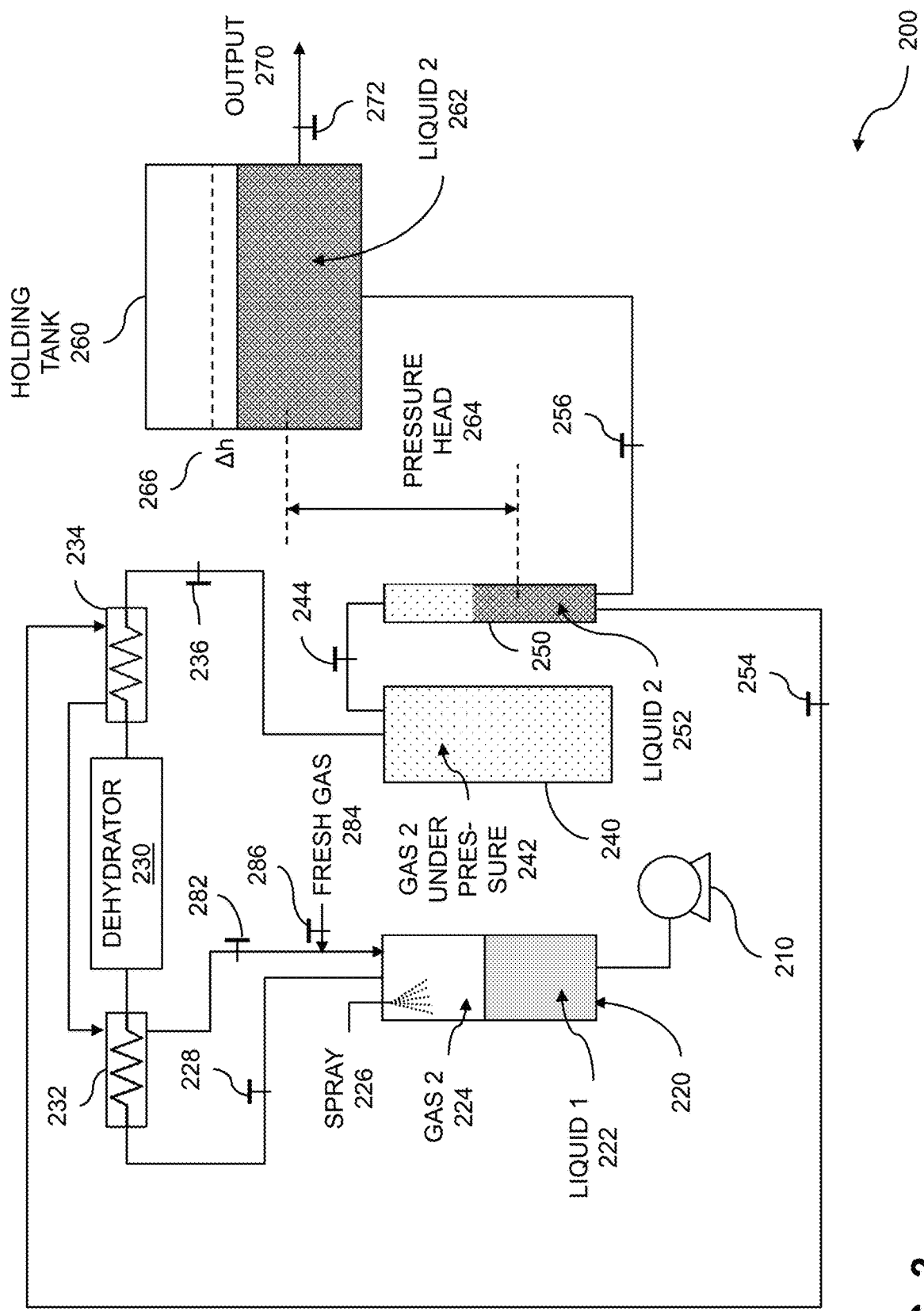
FIG. 2 is a block diagram for gas liquefaction.

FIG. 2 is a block diagram for gas liquefaction. Gas liquefaction includes controlling the conversion of a gas to a liquid by changing the temperature of the gas, the pressure of the gas, or both. Gas liquefaction can be controlled and can enable energy management by storing and recovering energy such as energy from renewable energy sources. A gas within a pressure containment vessel is pressurized using a column of liquid. The gas which is being pressurized is cooled using a liquid spray. A cryogenic liquid column is pushed, using the gas which is being pressurized, in a second vessel. The gas which is being pressurized is liquefied into the cryogenic liquid column.

A block diagram for gas liquefaction is shown. The block diagram 200 includes a pump 210. The pump can include a pump-turbine. The pump can include an electrically operated pump, a pump operated by a spinning turbine, and so on. The pump can be used to move a liquid such as a liquid 1 222. The block diagram 200 includes a pressure containment vessel 220. The pressure containment vessel and the pump can comprise a liquid piston system. The pressure containment vessel can contain the liquid such as liquid 1 being pumped by the pump and gas 224 such as gas 2 which can be compressed by the pumped liquid. The gas such as gas 2 can include $NH_3$, $CH_4$, Liquefied Natural Gas, air, or Freon™. The liquid at a pressure P can compress the gas to the pressure P. Since the compression of a gas can release heat such as the heat of vaporization, the released or excess heat can be removed by cooling. In the block diagram 200, the cooling can be accomplished by injecting a liquid spray 226 into the pressure containment vessel. The liquid spray can be used to cool the gas that is being pressurized. The liquid spray can include a dissimilar substance from the gas which is being pressurized and can keep the pressurizing of the gas to be isothermal.

The block diagram 200 includes a dehydrator 230. The dehydrator can be used to dehydrate the gas which is being pressurized after the cooling. Cooling the gas can cause vapor such as water vapor to form. The vapor, including water vapor, can be removed or separated from the gas. Removing vapor such as water vapor is performed to reduce or eliminate "freezing up" of system components such as pipes, valves, pressure containment vessels, and so on. The freezing up can include formation of ice. The block diagram 200 includes heat exchangers 232 and 234 on either side of dehydrator 230. The heat exchangers can provide cooling to compressed gas 2 224 after it is metered out by valves 228 and 236. The heat exchangers can use a portion of liquid 2 252 (described later) metered off by valve 254 and eventually recycled through valve 282 for a next gas filling of vessel 220. Other techniques can be performed on the gas.

The block diagram 200 can include a removal block (block not shown). The removal block can remove the dissimilar substance from the gas. The dissimilar substance can be removed for later reuse, applied to a different task, discarded, etc. The dissimilar substance can be removed from the gas after the cooling. The block diagram 200 includes a gas capacitor 240. The gas capacitor can comprise a pressure containment vessel, where the gas capacitor can be used to store gas, provide gas, receive gas, and so on. The gas capacitor can be used to store the gas such as gas 2 at pressure P 242.

The block diagram 200 includes a cryogenic tank 250. The cryogenic tank can be used to store one or more cryogenic liquid columns. A cryogenic liquid column can include a liquefied gas, where the liquefied gas can include a liquid such as liquid 2 252. Liquid 2 can be substantially similar to or substantially dissimilar from the liquid 1 discussed above. The block diagram 200 includes a valve 244. The valve can be control or meter the flow of the liquid from the cryogenic tank to a pressure containment vessel. The metering can be used to control a rise or a fall of the height of a cryogenic liquid column. The block diagram 200 includes a pressure containment vessel or holding tank 260. The pressure containment vessel can be coupled to the cryogenic tank 250 using the valve 244. A liquid such as liquid 2 262 is held at a pressure within the cryogenic tank. Liquid 2 can comprise a liquefied version of gas 2. Liquid 2 can enable filling of pressure containment vessel 260 through valve 256. A metered amount of gas 2 can be directed into pressure containment vessel 260. Gas 2 expands to push liquid 2 into holding tank 260. The pushing of liquid 2 by gas 2 adds an incremental pressure delta h 266 to the cryogenic column within holding tank 260. Note that the operation of the blocks within the block diagram can be cyclical. The cycling can include recycling of gas 2 with fresh gas 284, controlled by valve 286, in a subsequent cycle. Output 270 can be metered out of holding tank 260 using valve 272. The output is under pressure due to pressure head 264, developed by one or more cycles of gas 2 expansion in cryogenic tank 250.

Figure 3:
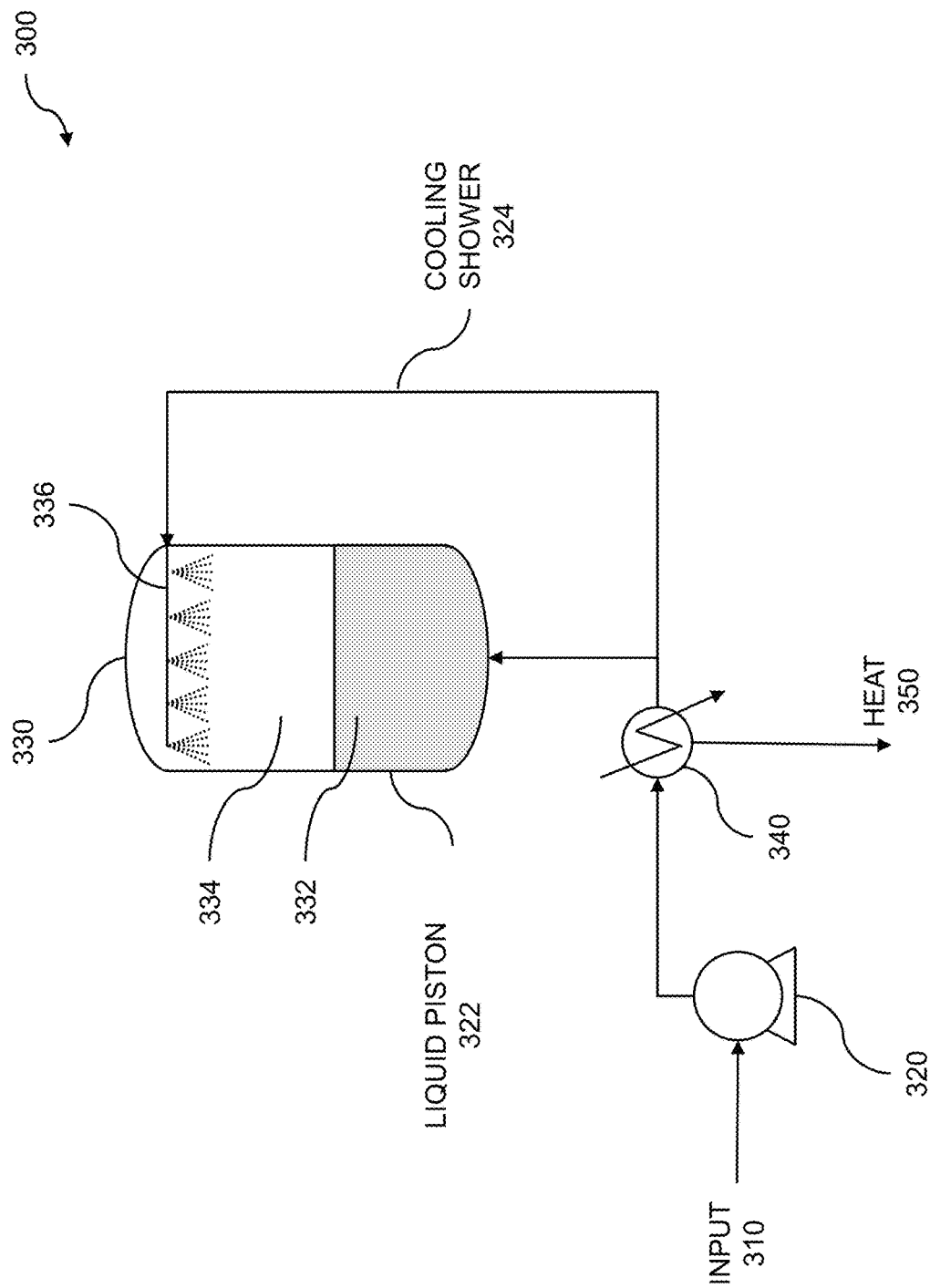
FIG. 3 shows the isothermal compression of a vapor employing a liquid piston (LP) and liquid spray.

FIG. 3 shows the isothermal compression of a vapor employing a liquid piston (LP) and liquid spray. Isothermal compression, followed by expansion, can be used to provide refrigeration. Refrigeration can be employed to cool enclosures, such as buildings or data centers. Refrigeration is a necessary component in the liquefaction of any gas with a dew point which is below ambient temperatures. Liquefaction of a gas such as liquefied natural gas (LNG) can be accomplished using refrigeration facilitated by isothermal compression. Isothermal compression enables controlled liquefaction using compatible materials for energy management. A first heating/cooling circuit and a second heating/cooling circuit are controlled. A gas within the first heating/cooling circuit is cooled with a liquid using a compression/flash-expansion mode, wherein compression is accomplished using a liquid piston. A gas is warmed within the second heating/cooling circuit, coupled to the first heating/cooling circuit, wherein expansion is accomplished using a liquid piston. Compression can be accomplished substantially isothermally using a liquid spray.

Isothermal compression of vapor 300 is shown. The isothermal compression of a vapor can be accomplished within a pressure vessel 330. The contents of the pressure vessel can include a liquid 332 and a vapor 334. A pump 320 can be used to pressurize and transport a liquid feed 310 into the pressure vessel 330. As additional liquid is introduced into the pressure vessel, the vapor gets compressed. The work of compression performed on the vapor would tend to increase its internal energy, and thereby, its temperature. Such temperature increase is undesirable, since it progressively increases the work of compression, which is monotonic with the temperature. It is thus desirable to cool the vapor continuously even as it is pressurized. To this end, the cooling shower 324 can comprise spray 336 within vessel 330 and can be injected into the vapor-space of the pressure vessel 330, which can help in keeping the compression process substantially isothermal. The liquid used as a cooling spray can be the same as that used as the liquid piston 322. The amount of liquid used for the spray can be a few percent of the amount used as liquid piston to fill the pressure vessel. This amount can be a slipstream of the main outlet stream of pump 320, as depicted in flowsheet 300. Alternately a separate, small pump (not shown) may be employed. The spraying can be accomplished using one or more inlets, ports, channels, injectors, and so on. In embodiments, the spraying is accomplished using nozzles. The nozzles can be positioned on a side of the pressure vessel. In embodiments, the nozzles are positioned in a top portion of the pressure vessel. A booster pump (not shown) may be employed on the slipstream to overcome the additional flow resistance from the nozzles and the hydraulic head. The spray absorbs the heat of compression and transfers it into the body of the liquid piston. Because the mass of piston liquid is much higher than the mass of the vapor or the spray, there is a small increase in the temperature of the liquid piston. Over many cycles, the small increases can become significant. The work done by the pump 320 can also cause a small increase in the piston temperature. It is desirable to keep the piston liquid temperature as low as possible as and generally not much higher than 10° C. above ambient. A cooler 340 may be employed at the outlet of the pump 320 to reject heat 350 to the ambient environment. The cooler can be an air-cooler, such as a fin-fan cooler, a cooling water heat exchanger, and so on.

As the pressure of the vapor continually increases during compression, its solubility in the piston liquid can increase. The limited interfacial area of the piston and the vapor can limit the mass transfer. However, the spray itself is designed to have good heat transfer with the vapor, and thus, by analogy, mass transfer. Thus, some vapor is incorporated into the piston liquid. The rest of the vapor can be expelled out of the pressure vessel at any target pressure by opening a suitable switching valve (not shown) situated near the top of the vessel while continuing to pump in more liquid. Alternatively, the vapor need not be expelled and can be retained within the vessel, such that its pressure continually rises and its dew point falls. Eventually, it can become a saturated vapor. Further compression does not increase the pressure significantly; instead, the vapor condenses into a liquid phase. The latent heat of condensation and dissolution is removed by the same spray. Eventually, the entire pressure vessel can be filled substantially with liquid and the vapor phase volume reduced to zero or close to zero. If this condensed liquid phase has only a limited mutual miscibility with the piston liquid, the two liquid phases will be distinct. The rest of this discussion continues for the case where the condensed phase and piston liquid are substantially miscible with each other. In this case the pressure vessel is substantially filled with a single liquid phase. Although, composition and density gradients are likely to exist across different elevations with the pressure vessel 330. A targeted, top portion of the liquid mass is then expelled out of pressure vessel 330 by opening a suitable switching valve (not shown) situated near the top of the vessel, while continuing to pump in more piston liquid. The expelled fraction of the pressurized saturated liquid is thus now available to provide refrigeration, which can be exploited as discussed below.

The vapor can comprise a low carbon number hydrocarbon, such as methane, ethane, propane, or butane, including isomers. The liquid phase can comprise C2 thru C20 hydrocarbons and their mutual solutions. Hydrocarbon liquids have high mutual miscibility. They form an important class of substances known as mixed refrigerants. Another important class of mixed refrigerants is mixtures of fluorocarbons, and less preferably, hydrofluorocarbons and chlorofluorocarbons, more commonly known as Freon™ refrigerants. Mixed refrigerants are particularly amenable to the liquid piston technology described herein.

In lieu of liquid sprays, solid packings (not shown) can be used to enable substantially isothermal compression or expansion of a vapor or gas in an enclosed space within the pressure vessel. In this approach, substantially all of the vessel is packed with a bed of solid packing media such that fluids can pass thru voids around the solid media comprising the bed. Packings can be randomly dumped into the bed onto a grid support. Such solid media include spheres, cylinders with single or multiple holes through them ("Raschig" rings), saddle shapes, and so on. More preferably, structured packings are used since they offer a better optimum of fluid flow resistance, voidage, and heat transfer characteristics. Structured packings can include thin corrugated sheet metal, or finned or embossed metal sheets, that are overlaid in flat or spiral form, with or without parting sheets. Other structured packings are in the shape of straight channeled monoliths such as are used within the catalytic convertors of automobiles. Media can be made of material that can withstand the extreme conditions within the pressure vessel, and can include metals, ceramics, or plastics.

As the vapor in such a packed pressure vessel gets compressed, the heat of compression can be substantially absorbed by the bed media. The heat capacitance of the media can be a large multiple of that of the gas, such that the temperature rise is no more than a few degrees, such as 10° C. Then as the media itself gets progressively wetted by, and submerged into, the piston liquid as its level rises, the piston liquid can absorb much of the heat, thereby cooling off the packed bed. Eventually, the entire vessel gets filled with piston liquid, and thus the entire packed bed is cooled. As previously explained, over many cycles, the piston liquid can warm up, and a heat exchanger external to the pressure vessel can be used. For example, a cooler analogous to the cooler 340 at the outlet of the pump can be used to ultimately reject all that heat of compression into the ambient.

Figure 4:
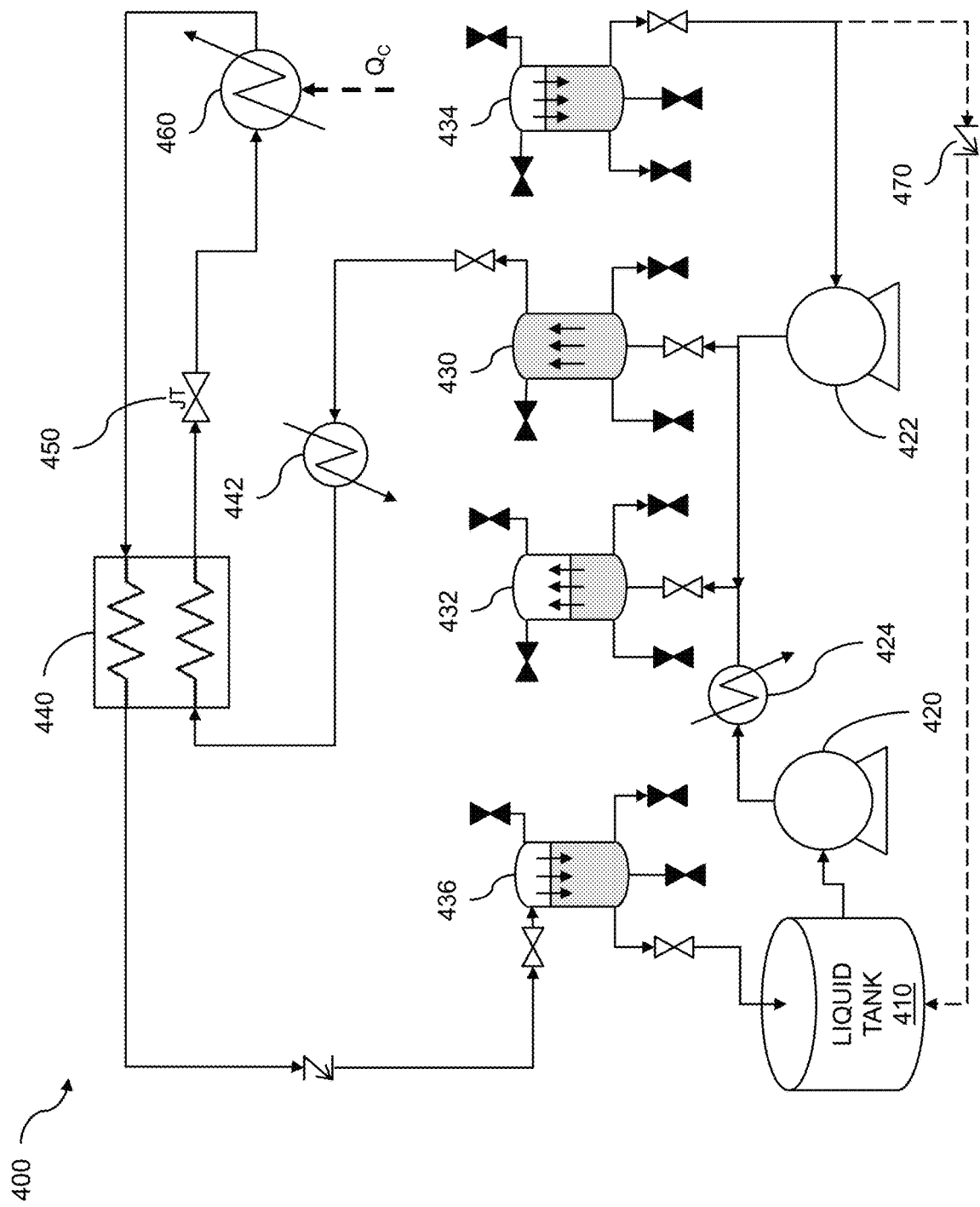
FIG. 4 illustrates a liquid piston refrigerator.

FIG. 4 illustrates a liquid piston refrigerator, employing near-isothermal compression of a refrigerant using the liquid piston discussed in the preceding section. Employing this technology in cycle embodiments discussed presently, gases, such as natural gas, can be liquefied to produce liquefied gases, such liquefied natural gas (LNG). LNG can be produced for ease of storage, transportation, and so on. A first heating/cooling circuit and a second heating/cooling circuit are controlled. A gas is cooled within the first heating/cooling circuit with a liquid using a compression/flash-expansion mode and wherein compression is accomplished using a liquid piston. A gas is warmed within the second heating/cooling circuit, coupled to the first heating/cooling circuit, wherein expansion is accomplished using a liquid piston.

A liquid piston refrigerator is shown 400. The liquid piston refrigerator can include a tank 410, where the tank can contain the piston liquid as a liquefied gas at a low pressure, P1. P1 can be chosen between one and 40 atmospheres. The low pressure can include one atmosphere of pressure. The tank and its contents can be at substantially ambient temperature. The liquefied gas can include a mutual solution of hydrocarbons, for example, propane dissolved in hydrocarbons heavier than propane. It can include a solution of a Freon™ of high volatility with a Freon™ of lower volatility. The tank can be coupled to a pump 420. The pump can include an electrically operated pump, a pump-turbine, and so on. The pump can be operated by coupling an electrical source to the pump, a gas or liquid source to the turbine of the pump-turbine, and so on. The pump can be used to pump liquid from the tank to one or more vessels such as vessel 430 and vessel 432. The vessels can include high-pressure vessels. The vessels can contain a liquid, such as shown in vessel 430, a gas (vapor) and a liquid, such as shown in vessel 432, etc. In embodiments, the liquid within a vessel can act as a liquid piston, where the liquid piston can be used to accomplish compression or expansion of the gas within the vessel. The liquid piston can be based on a variety of liquefied gases. The pump and the pressure vessel, including a liquid piston and a gas, comprise a liquid piston biphasic pressurizer.

Such a biphasic pressurizer comprises one or more identical pressure vessels, each with multiple flow conduits with switch valves. Switch valves that are open to flow are shown unshaded; those shut off to flow are shaded dark in the liquid piston refrigerator 400. Any one physical pressure vessel operates cyclically through the following steps:

(1) Vapor Pressurization in vessel-state 432 (P1⇒Ph). At the start of the step, the vessel is filled substantially with vapor. Liquid is pumped in, compressing the gas. Only the liquid inlet valve, typically at or near the vessel bottom, is open, and all the other valves are closed. Since the total volume is confined, the vessel pressure increases, accompanied by minor amounts of gas dissolution, and, optionally, vapor condensation. The vapor phase temperature can be maintained substantially isothermal by employment of sprays or packings, as previously discussed. The step culminates when the target pressure, Ph, and/or a target phase count, is attained. In embodiments, the target phase is liquid. In other embodiments, the target phase is a saturated or near-saturated vapor at pressure. This step is depicted in vessel 432 in liquid piston refrigerator 400.

(2) Fluid Expulsion in vessel-state 430 (Ph). This step commences when the target pressure, Ph, is reached and with the opening of a fluid outlet valve, typically at or near the top of the pressure vessel. Further pumping of fresh liquid no longer increases the pressure; rather, pressurized fluid flows out of the pressure vessel into the downstream process, which will be described presently. Since this step is isobaric, a spray is not necessary, and the sprayers can be turned off in the spray-employing embodiments. This step terminates when a targeted amount of pressurized fluid has been expelled. In embodiments, the entire vessel 430 is substantially full of a single liquidous phase throughout the progression of this step. Determination of the target expulsion amount is discussed presently. In other embodiments, the target phase is a vapor, and the target expulsion amount is reached when all the vapor has been expelled, so the liquid substantially fills the vessel.

(3) Depressurization in vessel-state 434 (Ph⇒P1). This step commences after the target amount of pressurized process refrigerant has been expelled. The refrigerant outlet valve at the top closes, and the depressurizing liquid outflow valve at or near the vessel 434 bottom opens. The vessel pressure falls from Ph back to P1. This can be accompanied by flashing of a minor amount of the liquid contents into the vapor space. Liquid is pushed out of the outflow valve at progressively decreasing pressure. This can be reused to pressurize and pump fluid out in the prior two steps. A separate pump 422 can be employed to this end, in which case, the vapor flashing off into the upper space pushes the liquid in the lower space into the pump inlet, performing inlet flow work. Alternatively, the liquid can simply be routed to the tank 410 thru a check valve—shown as a dashed flow line in the refrigerator 400. In certain embodiments where the vessels are equipped with means to spray, a spray can be turned on to keep the vapor substantially isothermal, or the spray can remain shut off, allowing the temperature to fall. This step culminates with the vessel pressure reaching the low pressure, P1.

(4) Vapor Return and Refill in vessel-state 436 (P1). This step commences when the pressure vessel 436 has reached its target low pressure P1. The depressurizing liquid outflow valve at the bottom closes; the piston liquid drain valve at the bottom opens to tank 410. The process-return refrigerant fluid inlet valve at or near the top opens up, and the returning "spent" process refrigerant, at pressure P1, is aspirated to refill the pressure vessel. The returning fluid can be biphasic, that is, a liquid-vapor mix, or preferably, it can be purely vaporous. This step is substantially isobaric, and the spray, if so equipped, can be turned off. The step ends when the liquid level reaches a low point in the pressure vessel. At this juncture, the return refrigerant valve and the piston liquid drain valve both close, and the pressure vessel is ready to commence the first step of the next cycle.

Note that the mass of high-pressure refrigerant expelled out of the pressure vessel in state 430 in step 2 should match the mass of fluid at low pressure P1 filling the pressure vessel in state 436 in step 4. Since the working volume of the vessel is known, and the density of the fluid at the low pressure P1 can be determined from well-known thermodynamic properties and correlations, the mass of fluid expelled is simply the product of the vessel working volume and density at the low pressure P1. Note also that when a condensate is only partially miscible with the piston liquid, there may be technically three phases comprehended by the term "biphasic", which refers primarily to the simultaneous presence of both a liquid and a gas.

A single pressure vessel cycling through the above steps can only furnish a pressurized refrigerant stream intermittently, since fluid expulsion to the downstream process occurs only during the $2^{nd}$ step portion of the whole cycle. At least four identical pressure vessels are required to furnish the pressurized refrigerant stream continuously, and to receive expended refrigerant continuously. One way to interpret refrigerator 400 is as a snapshot of the four vessels, namely 430, 432, 434, and 436, as each is undergoing a different step (one of the four) in the aforementioned sequence. The vessels undergo an identical sequence of steps, but a quarter-cycle out of phase. This can be advantageous, because it is desirable to have the downstream process, and the liquid feed pumps, operate continuously rather than intermittently. An alternate interpretation of refrigerator 400, which was adopted in the sequence description above only for purposes of clarity, is that it represents the four different states of the same pressure vessel, the state designators of which are indicated alongside the step labels in the sequence description above. The pressures at the start and end of cycle are also indicated.

The discussion thus far has focused on the description of the biphasic pressurizer. The primary purpose of the biphasic pressurizer is to furnish a stream of pressurized refrigerant to a downstream refrigeration load. A secondary purpose is to accept "spent" refrigerant, thereby facilitating reuse of the refrigerant species. This will be described now in the context of refrigerator 400.

Pressurized refrigerant, at the high pressure, Ph, expelled out of pressure vessel 430, is cooled in the heat exchanger 442 to a near-ambient temperature. Ph can be chosen within the range of 5 to 100 atmospheres. An exemplar value for Ph can be 10 atmospheres. In embodiments, the expelled phase is a saturated or slightly superheated vapor, and it gets substantially or entirely liquefied in heat exchanger 442 by shedding heat into the ambient atmosphere. In this embodiment, however, the expelled phase is a saturated liquid and heat exchanger 442 becomes optional. The liquefied stream then is further cooled below ambient temperature by heat exchange with warming, returning, spent refrigerant in heat exchanger 440. An exemplar temperature can be about −16° C. This precooled high-pressure substantially or entirely liquefied refrigerant is then throttled across a flow resistance, such as a Joule-Thomson (JT) throttling valve, to the low pressure, P1. A minor portion, in the range 1-40%, say 15%, of the liquid can flash adiabatically, and the latent heat of vaporization can self-cool the stream down to the target refrigeration range of 20° C. to −100° C. An exemplar target refrigeration temperature can be about −42° C. The low-pressure fluid can then flow through evaporator 460 where it substantially, or preferably entirely, evaporates to a vapor phase, soaking up the latent heat of vaporization, Qc, from the refrigeration load which is desired to be cooled. Initially, the vapor is rich in the more volatile component. As the vaporization proceeds, there can be more vaporization of the less volatile component, accompanied by a warming of a few degrees. The evaporator 460 can be a heat exchanger through which the cooling load stream flows (not shown) in thermal contact, but physically isolated from the refrigerant. The cooling load can be a natural gas stream that is required to be cooled and liquefied to produce LNG. Alternatively, the cooling load stream can be any other stream that needs to be cooled to a temperature below ambient, such as CO2 or permanent gases. The heat exchanger can be a coil-wound type, a plate-and-frame type, a compact heat exchanger with corrugated or embossed sheets, or other suitable types. It can employ finning on tubes or sheets that furnishes an extended heat transfer surface. Alternatively, the cooling load stream can be recirculating atmospheric air from a building or a data center. Alternatively, the evaporator 460 can be immersed in a liquid bath that is required to furnish a cold environment to other processes or environments. Alternatively, the cooling load may be in direct, temporary, physical contact with the cooling load, as long as it can be substantially separately recovered for reuse.

The refrigerant stream exiting evaporator 460 has a vapor fraction higher than when entering. Preferably, it is substantially vapor. More preferably it is entirely vapor. Since it has surrendered all its cooling capability to the refrigeration load in the evaporator 460, it can be considered "spent", but still cold, and still worthy of reuse. Since it is still cold, it can be used to precool the fresh pressurized refrigerant being expelled in step 2 from the biphasic pressurizer previously described; this can be accomplished in heat exchanger 440. The spent refrigerant exiting heat exchanger 440 is now within a degree or a few degrees below the fresh entering high-pressure refrigerant, and it can be aspirated into pressure vessel 436 during step 4. It can be then be recompressed to the high pressure Ph, condensed, and reused again.

The design choices of the mixed refrigerant components, composition, and the values for the high pressure Ph and the low pressure P1 are targeted towards the temperature or range of temperatures where the refrigeration load is required. Disclosed techniques can use the less volatile fraction of a mixed refrigerant as a liquid piston in a biphasic pressurizer to compress the more volatile fraction of the refrigerant. Using a liquid piston in conjunction with a spray or packing can afford near-isothermal compression that minimizes the compression power required. For example, a compression ratio of 10:1 can be achieved in a single stage of a liquid piston, without the need for multiple stages and intercooling between stages. Using the same components of the refrigerant as the piston liquid can also avoid the introduction of foreign substances that can freeze at the temperature of the refrigeration load. For example, if water were used for the piston liquid of a liquid piston, traces of water vapor could contaminate the refrigerant and freeze up at load temperatures below 0° C., which could block passages of the heat exchangers.

In alternative embodiments, the high-pressure fluid expelled out of the biphasic pressurizer during the fluid expulsion step 2 can be substantially or entirely vapor. This is described in detail now using a specific example with a mix propane and octane, still based on the structure of the refrigerator 400.

Piston liquid from the liquid buffer tank 410 can be pumped into one of four pressure vessels in a biphasic pressurizer. The piston liquid can be a near-saturated solution of propane (C3) in octane (C8) at the system low pressure, chosen to be about 1 atmosphere here. A cooler 424 at the outlet of the pump 420 can cool off the pumped liquid to near ambient conditions and can serve to reject accumulated heat of compression to at least ambient temperatures. The pressure vessel 432 can be initially filled with vapor at about 1 atmosphere and at ambient temperature. The vapor can be substantially propane. The pressure vessel can also be filled with packing, preferably structured packing along the lines already described in the preceding sections. The packing can fill 90-95% of the vessel, leaving the top 5-10% unpacked. All the switching valves can be closed, except the bottom piston liquid inlet valve. As the piston liquid is pumped into the vessel, it fills the pressure vessel from the bottom up, and its level can rise and the vapor can get progressively compressed to higher pressures. The heat of compression can be substantially removed and retained by the structured packing, which has a thermal mass much higher than that of the vapor and has a substantial interface with the vapor in its immediate vicinity. The vapor compression, thus, can be substantially isothermal. A small amount of vapor can also dissolve into the piston liquid, but the amount so dissolved can be limited by the lower cross-sectional area between the liquid and vapor, and the suppression of the interfacial turbulence by the packing itself.

Vapor compression can continue as described such that the pressure in the tank reaches about 9 atmospheres, a value still below the saturation vapor pressure for propane of 9.4 atmospheres at 25° C. At this point, the liquid level can be at or in the vicinity of the top of the packed portion of the pressure vessel. Piston liquid pumping and vapor compression can continue to about 10 atmospheres, but the last portion of compression from about 9 to about 10 atmospheres can be substantially adiabatic rather than isothermal, in the substantial absence of any intimate contact with the packing. Thus, the vapor temperature can rise to about 35° C., which is above the saturation vapor temperature of propane at 10 atmospheres, which is 27.5° C. The vapor can be saturated with a small amount of octane. Since octane is much less volatile than propane, its composition in the vapor can be limited to about 0.2-0.3 mole %. This marks the end of the alternative embodiment vapor pressurization step.

At this point, the high-pressure refrigerant outlet valve at the top of the pressure vessel opens, and the pump continues to fill the pressure vessel with liquid at a constant pressure of about 10 atmospheres, driving the vapor out the top of the vessel. The fluid expulsion step 2 concludes when the liquid level rises to the top, at about the position of the top outlet. At this point, substantially all of the propane-dominant vapor at 10 atmospheres and 35° C. has been expelled out of the vessel into the downstream process, such that very little, preferably close to none, of the piston liquid gets expelled.

All the valves then close, and the depressurizing liquid outlet valve at the vessel bottom briefly opens. The minor amount of excess propane dissolved in the piston liquid solution can flash off, pushing the liquid out into the buffer tank thru check valve 470 (shown as part of the dashed line), so that the pressure quickly drops to 1 atmosphere. In this embodiment the pump 422 can be—but preferably is not—used, because the amount of dissolved flash gas is minor. This concludes the depressurization step 3. This valve can then close, and both the spent refrigerant vapor return valve at the top, and the piston liquid drain valve at the bottom, can open, thus enabling the vapor return and refill step 4. Spent refrigerant at about 1 atmosphere, returning from the refrigeration process, can be then aspirated into the pressure vessel to substantially fill the vessel with propane vapor at about 1 atmosphere during the refrigerant return (refill) step. This completes one cycle, and the cycle is ready to repeat.

While the production of the 10 atmosphere propane refrigerant from any one vessel is intermittent, four pressure vessels operating in identical fashion, but a quarter-cycle out of phase, can furnish a continuous stream of refrigerant to the load, and can accept a continuous stream of spent refrigerant, that is, propane-dominant vapor at 1 atmosphere.

Pressurized refrigerant which has been expelled from the biphasic pressurizer at 10 atmospheres and 35° C. (pressure vessel 430) can be cooled in a process cooler 442 to liquefy substantially or all of the vapor to a subcooled liquid at about 25° C. and about 10 atmospheres. Heat can be rejected into the ambient atmosphere, either directly via fin-fan coolers, or indirectly via cooling water coolers. No refrigeration is required to reject such heat into the ambient environment, which can furnish an infinite heat sink. The subcooled 25° C. liquid stream can be precooled against cold, returning, low pressure "spent" refrigerant, to about −16° C. in heat exchanger 440. It can then be throttled across a Joule-Thomson (JT) valve 450 to about 1 atmosphere. The stream quickly cools itself off to its saturation temperature of about −42° C., and about 15% of the liquid evaporates in this isenthalpic flash process. This stream can then contact the refrigeration load in evaporator 460, and substantially all of the liquid can evaporate, while soaking up the required latent heat of vaporization from the load. Thereby, a refrigeration duty consistent with the stream evaporation load is provided to the refrigeration load at a near constant temperature of about −42° C. The small amount of octane in this stream can mostly condense to a few drops of liquid, but most importantly, does not freeze up, since the freezing point of octane is lower, namely at about −57° C. Thus, a component of the piston liquid, octane, does not contaminate the refrigerant fluid, and is thereby a compatible fluid for the purposes of certain disclosed embodiments. In contrast, a piston fluid such as water, with a freezing point of about 0° C., would freeze at the load temperature, blocking the passage of refrigerant in the closed loop. It is thus a contaminant and not a compatible piston liquid. A contaminant is any component that can cause disruption in the continuous operation of the loop, such as by freezing. A compatible piston liquid does not contain substantially any contaminants.

The spent refrigerant from the load, which can be substantially all propane vapor with a minor amount of liquid octane, can be still at about 1 atmosphere and −42° C. It can be used to precool the fresh high-pressure liquid refrigerant entering into the process as subcooled liquid, while itself warming in the heat exchanger 440, in a countercurrent fashion, to within a degree or a few degrees below 25° C. It can then get aspirated into the biphasic pressurizer, into the pressure vessel 436 undergoing the refrigerant vapor return and refill step 4. The refrigerant can operate in perpetuity in this closed loop system.

As described, the octane does not contribute materially to the refrigeration duty; it is only present in miniscule amounts in the streams servicing the refrigeration load, and it does not evaporate there. Thus, the refrigeration is provided at a single temperature (−42° C. here), as is typical of a pure component refrigerant at a single pressure level. The primary function of the octane is as a majority constituent in the piston fluid in the biphasic pressurizer, but without freezing on contact with the refrigeration load. This enables the piston liquid to be compatible with the refrigerant and compatible with the downstream process of refrigeration. In contrast, a piston liquid such as water would need constant drying within the loop, otherwise it could freeze at the load temperature and plug up flow passages in the refrigeration process loop. In embodiments, drying is not required following cooling.

In many gas liquefaction processes, it can be desirable to provide refrigeration at multiple temperatures. A pure component such as propane can still be used, but can be flashed to multiple pressure levels in a cascade. Thus, a 10 atmosphere propane stream can be flashed first to 5 atmospheres and −5° C., and then to 1 atmosphere and −42° C. The return streams are separately warmed in the recuperative heat exchanger/precooler and processed in additional, separate pressure vessels within the biphasic pressurizer. Alternatively, additional components can be added to the mixed refrigerant, for example, components such as C2 or C4 or C5 that are more volatile than C8. These components can materially provide refrigeration duty at a wider range of temperatures than the pure C3+C8 mix. The main requirement is that they are a liquid solution at ambient temperatures and at the pressure level chosen in buffer tank. This ensures that they are available as a piston liquid to compress a vapor comprised of more volatile components to a pressure such that substantially all the vapor can also liquefy while rejecting heat to the ambient environment.

Incorporation of the vapor into the piston liquid can occur from dissolution of the vapor components into the piston liquid. This solubility increases with pressure, but it is reversible. Additional compression power can be consumed when any portion of the vapor is compressed only to dissolve in the piston liquid, though the power can be substantially recovered during the depressurization step when the dissolved components flash off (evolve), performing flow work on the piston liquid as it feeds the pumps. However, volumetric productivity can be impacted, since the dissolved gas does not contribute to the refrigeration. The packing approach can minimize such dissolution. The spray approach can have a somewhat higher dissolution, but enjoys a near full utilization of the vessel interior volume.

Incorporation of the vapor into the piston liquid can also be caused by bulk condensation, when the final compression pressure exceeds the dew point pressure. In the C3/C8 embodiment, this was intentionally avoided since there was no advantage gained in allowing liquid octane to flow to the refrigeration load where it cannot meaningfully contribute, since it cannot vaporize at those conditions. In contrast, recall that the first embodiment described does allow the vapor to condense into the piston liquid before expulsion. This approach can furnish a mixed refrigerant with a wider boiling range at the refrigeration load when employing a piston liquid comprising hydrocarbons with closer relative volatility than C3 vs C8. Having such components in the refrigerant, boiling off at a range of temperatures at the refrigeration load, is of particular advantage in gas liquefaction, such as for use in producing liquefied natural gas (LNG).

Thus, there is a compatibility between the piston liquid that is pumped and the vapor that is being compressed by the liquid piston liquid. A method of refrigeration is disclosed comprising: pumping a compatible liquid into a closed chamber to compress a refrigerant vapor, wherein the compatibility is between the liquid that is pumped and the refrigerant vapor, within a refrigeration process comprising: increasing pressure in the closed chamber by pumping additional compatible liquid into the closed chamber, wherein the increasing pressure is controlled to prevent condensation of the vapor inside the closed chamber into the liquid; removing the heat of compression from the vapor simultaneously with compression; withdrawing the compressed vapor from the chamber; condensing at least a portion of the compressed vapor into a liquid condensate, wherein the condensing includes cooling the compressed vapor; and flashing the liquid condensate to release at least a portion of the vapor that was condensed, wherein the flashing results in absorbing a latent heat of vaporization from adjacent surfaces in thermal contact with the liquid.

Figure 5:
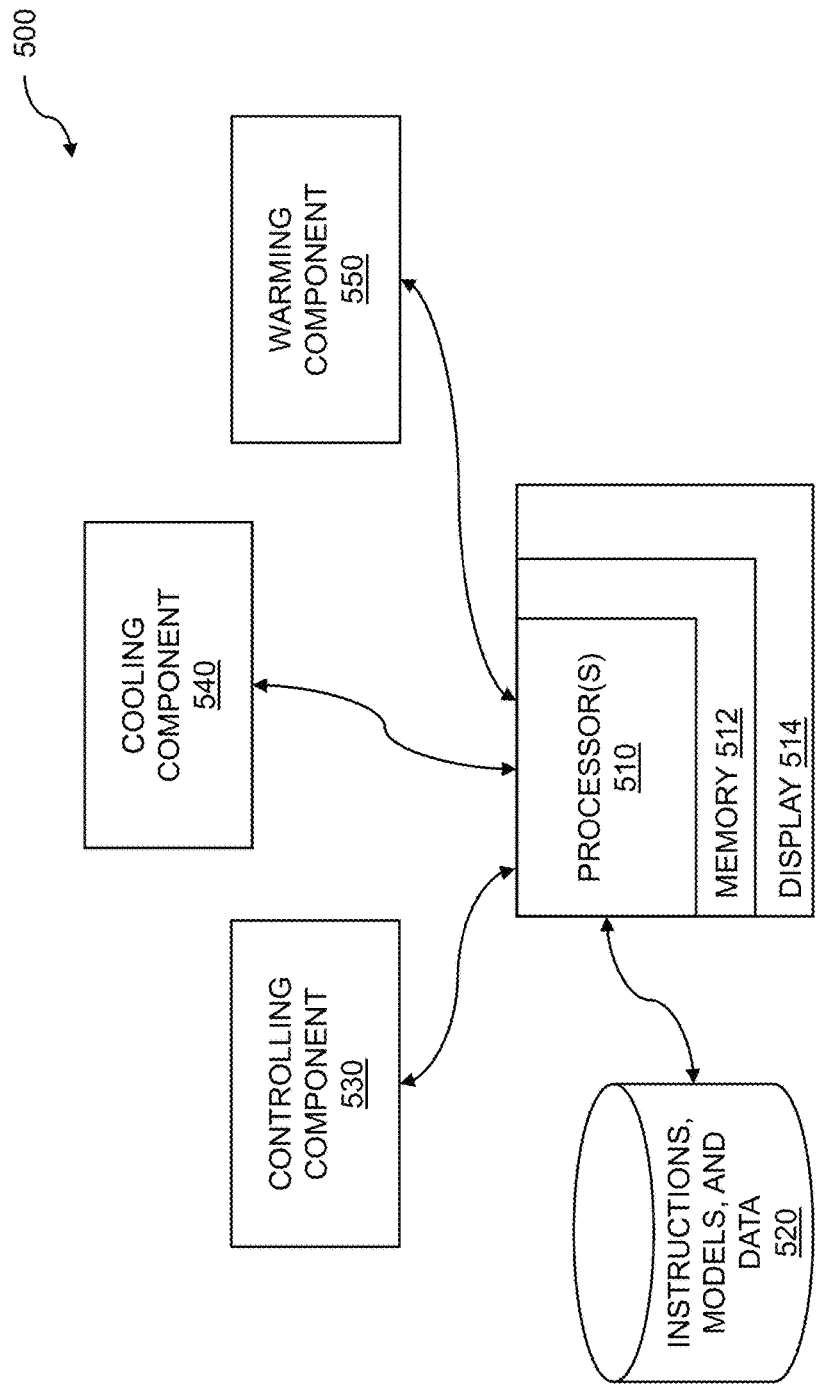
FIG. 5 is a system diagram for liquefaction control.

FIG. 5 is a system diagram for liquefaction control. Enabling a liquefaction control system is based on controlled liquefaction and energy management. A first heating/cooling circuit and a second heating/cooling circuit are controlled. A gas is cooled within the first heating/cooling circuit with a liquid using a compression/flash-expansion mode, wherein compression is accomplished using a liquid piston. A gas is warmed within the second heating/cooling circuit, coupled to the first heating/cooling circuit, wherein expansion is accomplished using a liquid piston.

The system 500 can include one or more processors 510 and a memory 512 which stores instructions. The memory 512 is coupled to the one or more processors 510, wherein the one or more processors 510 can execute instructions stored in the memory 512. The memory 512 can be used for storing instructions, for storing databases for liquefaction systems, for storing switching valve and non-return valve configurations, and the like. Information regarding controlling a liquefaction and energy management system can be shown on a display 514 connected to the one or more processors 510. The display can comprise a television monitor, a projector, a computer monitor (including a laptop screen, a tablet screen, a netbook screen, and the like), a smartphone display, a mobile device, or another electronic display. The system 500 includes instructions, models, and data 520. The data can include information on liquefaction systems; controlling heating/cooling circuits; controlling switching valves, non-return valves, or smart valves; metadata associated with liquefaction; and the like. In embodiments, the instructions, models, and data 520 are stored in a networked database, where the networked database can be a local database, a remote database, a distributed database, and so on. The instructions, models, and data 520 can include instructions for obtaining access to a pressure vessel, where the pressure vessel can be a component within a liquid piston system. The instructions, models, and data can further include instructions for controlling a first heating/cooling circuit and a second heating/cooling circuit, for cooling a gas within the first heating/cooling circuit and for warming a gas within the second heating/cooling circuit; for cooling a liquid spray and for injecting a liquid spray; and so on. In embodiments, the instructions, models, and data, can be executed to enable compression that is substantially isothermal.

The system 500 includes a controlling component 530. The controlling component 530 can control a first heating/cooling circuit, a second heating/cooling circuit, and so on. The heating/cooling circuits can include a high-pressure vessel, valves, pumps, and heat exchangers that can be used for heating and cooling and the like. The heating/cooling circuit can include multiple phases, where the phases can include a liquid and a gas. The liquid can comprise a liquid piston, where the liquid piston can be used to compress the gas. The gas can include a variety of gases. The gas that is used and the liquid that is used can include compatible materials. In embodiments, the gas and the liquid do not introduce impurities to one another. For example, the compatible materials can include water vapor and liquid carbon dioxide. The system 500 includes a cooling component 540. The cooling component 540 can cool a gas within the first heating/cooling circuit with a liquid using a compression/flash-expansion mode and where compression is accomplished using a liquid piston. The cooling the gas can counteract the heating of the gas caused by the compression of the gas. In embodiments, compression can be accomplished substantially isothermally. Isothermal compression can be accomplished by removing excess heat that results from the compressing. In embodiments, the compression can be accomplished substantially isothermally by use of liquid spray. Since the liquid used for the spray can increase in temperature due to pumping of the liquid, the liquid use for the liquid spray can be cooled. Further embodiments include performing heat exchange to cool the liquid spray before cooling. The spraying can be accomplished using inlets, ports, injectors, and so on. In other embodiments, the spraying is accomplished using nozzles.

The system 500 includes a warming component 550. The warming component can warm a gas within the second heating/cooling circuit, coupled to the first heating/cooling circuit, wherein expansion is accomplished using a liquid piston. Recall that expansion of a gas can be endothermic in that as the pressure of the gas is reduced, the temperature of the gas is also reduced. To prevent precipitation with a vessel such as a high-pressure vessel, the gas within the vessel can be warmed in order to keep the gas at a substantially constant temperature. The warming of the gas can be accomplished using a heat exchanger. In embodiments, the heat exchanger comprises a coil-wound heat changer (CWHE).

Disclosed embodiments can include a computer program product embodied in a non-transitory computer readable medium for liquefaction control, the computer program product comprising code which causes one or more processors to perform operations of: controlling a first heating/cooling circuit and a second heating/cooling circuit; cooling a gas within the first heating/cooling circuit with a liquid using a compression/flash-expansion mode and wherein compression is accomplished using a liquid piston; and warming a gas within the second heating/cooling circuit wherein expansion is accomplished using a liquid piston.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc;

an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A method for refrigeration control comprising:
    pumping a liquid into a closed chamber to compress a vapor;
    increasing pressure in the closed chamber by pumping additional liquid into the closed chamber, wherein the increasing pressure enables assimilation of the vapor into the liquid;
    removing the heat of compression from the vapor simultaneously with compression, wherein the removing heat results in maintaining isothermality, and wherein the removing heat is accomplished simultaneously with the pumping a liquid into the closed chamber;
    withdrawing the liquid from the chamber, wherein the liquid contains the vapor that was assimilated; and
    flashing the liquid to release at least a portion of the vapor that was assimilated, wherein the flashing results in absorbing a latent heat of vaporization from adjacent surfaces in thermal contact with the liquid, and wherein the absorbing a latent heat of vaporization from adjacent surfaces results in furnishing a refrigeration duty.

2. The method of claim 1 wherein the vapor is assimilated into the liquid.

3. The method of claim 2 wherein the assimilation comprises at least a 10% mass reduction of the vapor.

4. The method of claim 1 wherein the flashing comprises reducing pressure for the liquid.

5. The method of claim 4 wherein the flashing of the liquid accomplishes vaporizing of the liquid.

6. The method of claim 4 wherein the flashing results in boiling of the liquid.

7. The method of claim 1 wherein the refrigeration duty reduces a temperature of the adjacent surfaces or adjoining media below an ambient temperature.

* * * * *